United States Patent [19]

Iwasaki

[11] Patent Number: 5,034,997
[45] Date of Patent: Jul. 23, 1991

[54] COMMUNICATION SYSTEM FOR DATA TRANSMISSION AND RECEPTION USING RADIO WAVE AND OPTICAL TRANSMISSION OF MESSAGE SIGNALS

[75] Inventor: Yoshiki Iwasaki, Yokohama, Japan
[73] Assignee: Victor Company of Japan, Ltd., Yokohama, Japan
[21] Appl. No.: 339,980
[22] Filed: Apr. 18, 1989
[30] Foreign Application Priority Data
 Apr. 19, 1988 [JP] Japan ............................. 63-51608[U]
[51] Int. Cl.$^5$ ..................... H04B 10/00; H04B 7/00
[52] U.S. Cl. ................................... 455/617; 455/601; 455/618; 455/619; 455/59; 455/101; 455/103; 340/825.69; 340/825.72
[58] Field of Search ............... 455/601, 612, 617, 618, 455/619, 66, 101, 102, 103, 59; 379/56; 340/825.44, 825.69, 825.72

[56] References Cited

U.S. PATENT DOCUMENTS 3,513,443 2/1967 Andersen ...................... 340/825.44
4,259,746 3/1981 Sandstedt ........................ 455/612
4,599,745 7/1986 Baran et al. ..................... 455/612
4,775,996 10/1988 Emerson et al. ................. 379/56
4,904,993 2/1990 Sato ................................ 455/603

Primary Examiner—Reinhard J. Eisenzopf
Assistant Examiner—Kinfe-Michael Negash
Attorney, Agent, or Firm—Fleit, Jacobson, Cohn, Price, Holman & Stern

[57] ABSTRACT

A radio communication system such as a radio paging system or the like, for data transmission and reception, which is comprised of a transmission device and a reception device. The transmission device comprises a modulation circuit, a radio signal transmitter for transmitting message signals, through air, after converting them into radio signals, and an optical signal radiator for radiating the message signals, through air, after converting them into optical signals. The reception device is capable of receiving both the radio and optical signals, combining these signals in order to reproduce the message signals, and demodulating the message signals from the combined signals.

14 Claims, 9 Drawing Sheets

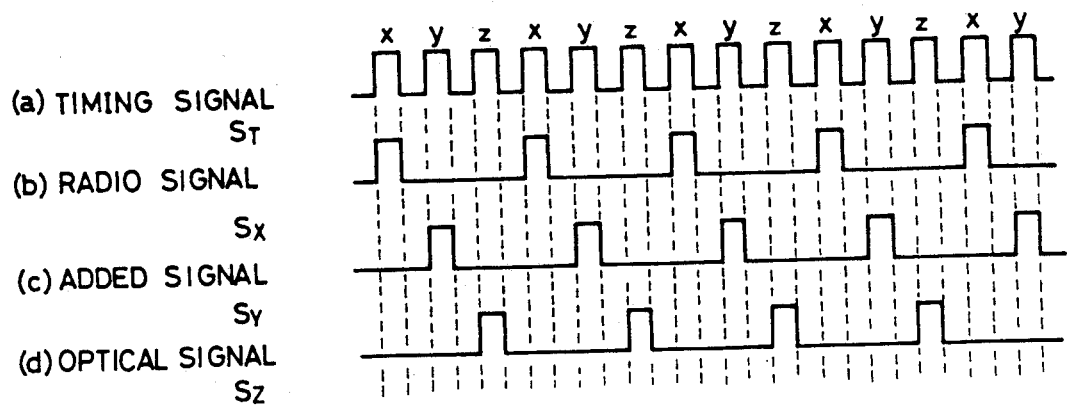
(a) TIMING SIGNAL $S_T$
(b) RADIO SIGNAL $S_X$
(c) ADDED SIGNAL $S_Y$
(d) OPTICAL SIGNAL $S_Z$
F I G. 7
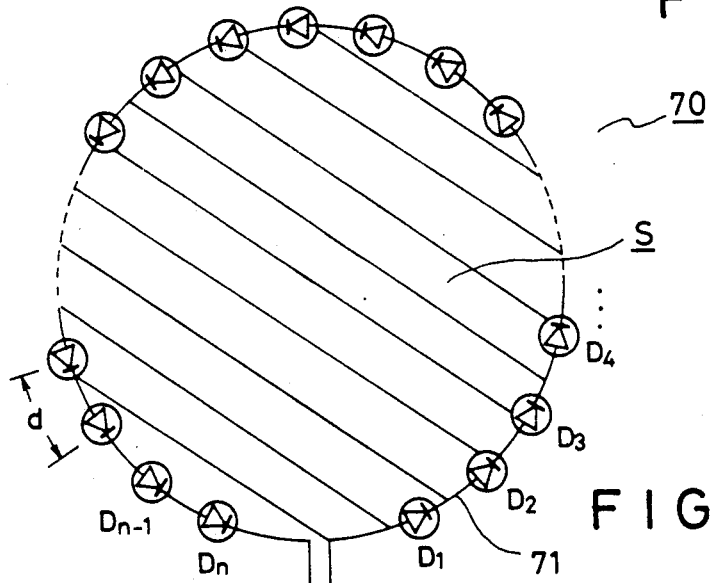
F I G. 8A
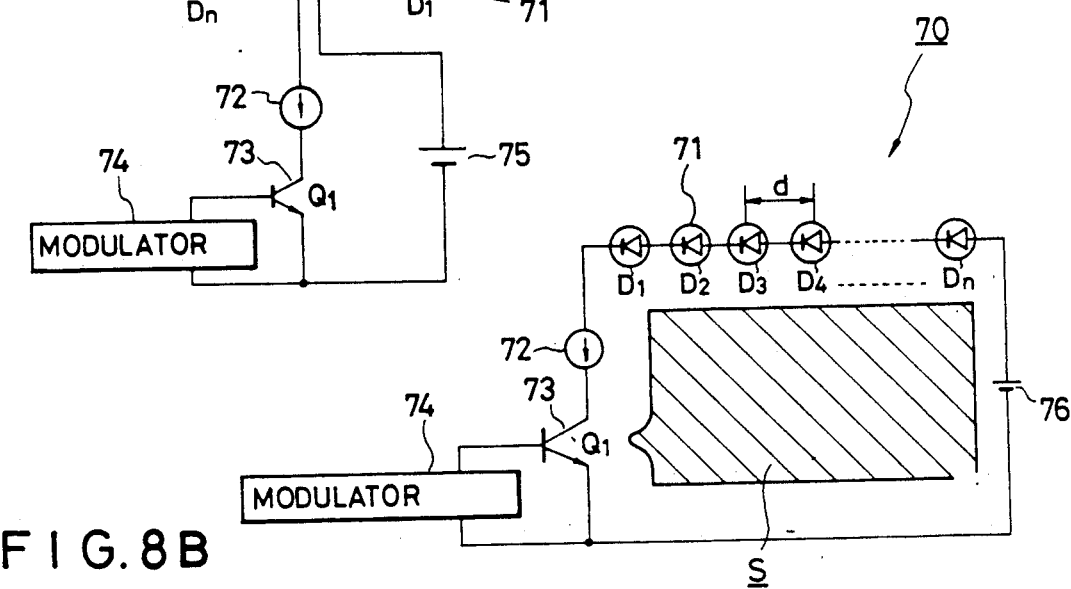
F I G. 8B

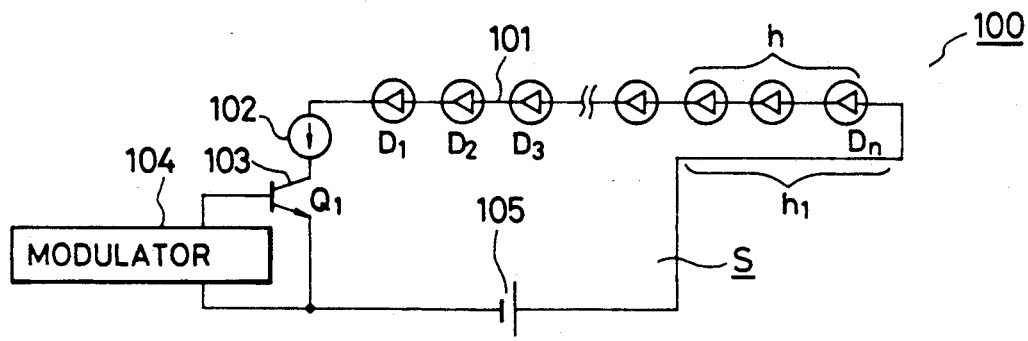
F I G. 11
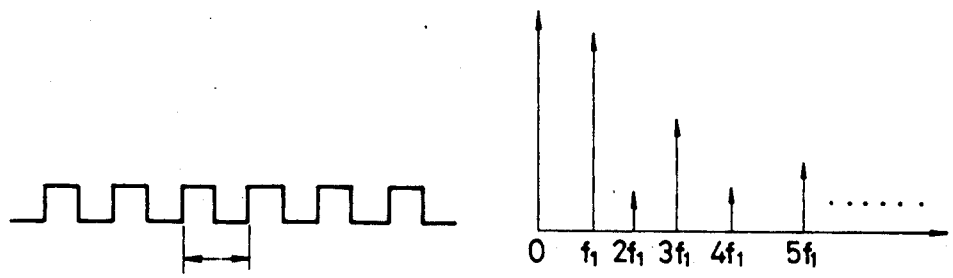
F I G. 12
F I G. 13
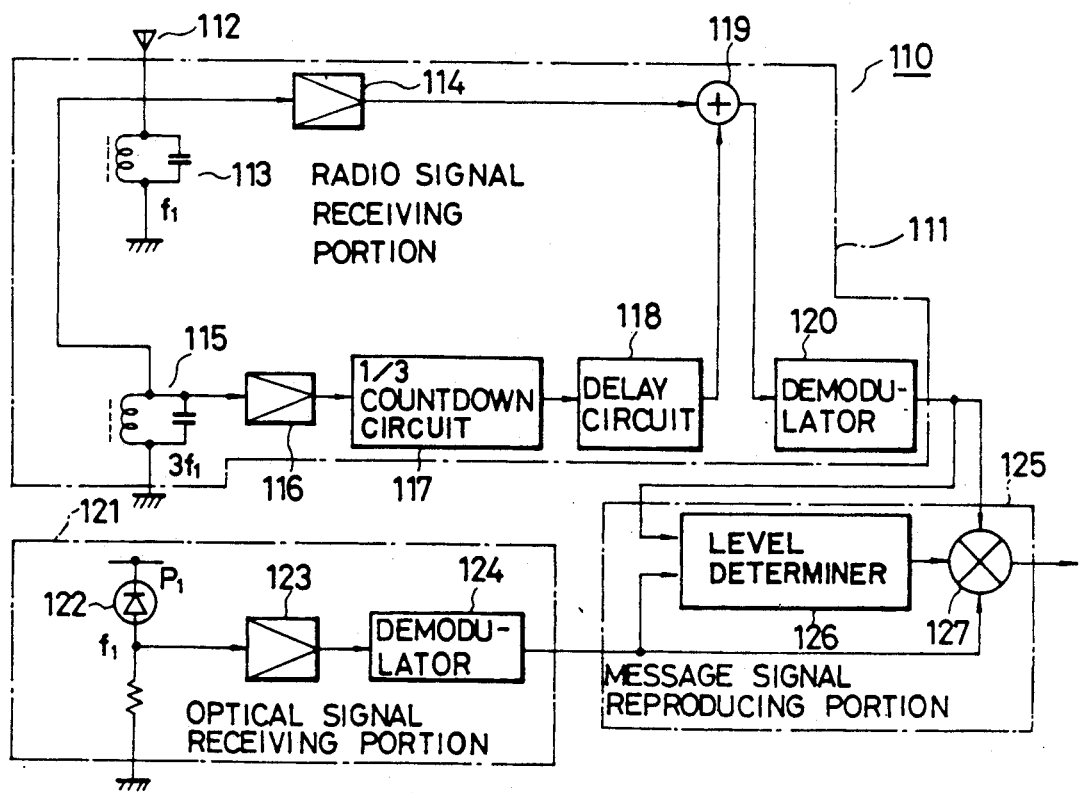
F I G. 14

L, C₁ = $f_1$
L, C₂ = $2f_1$
L, C₃ = $3f_1$

COMMUNICATION SYSTEM FOR DATA TRANSMISSION AND RECEPTION USING RADIO WAVE AND OPTICAL TRANSMISSION OF MESSAGE SIGNALS

BACKGROUND OF THE INVENTION

This invention relates to a radio communication system for transmitting and receiving data, more particularly relates to a system capable of transmitting message data to a plurality of terminal apparatuses after a master apparatus converts the data into optical signals and radio signals.

A radio paging system or the like is proposed in general and concrete as an example of a radio communication system. The radio paging system can be defined as a personal call system, a so called "beeper," "radio pager," or "a pocket bell" as called by the Japanese, which a specified person having left one's seat (recited as "the paged" hereinafter in this specification) is called and receives messages by a wireless apparatus within a defined area such as a firm, hospital, factory, and so on. Such systems comprise transmitters being arranged on inner surfaces of a building such as ceilings, walls or the like, and receivers being put in the pocket of the paged, and carried with them. The signals transmitted from the transmitters include a signal into which the specified messages are converted, and which is received by receivers, so that the communication of messages is performed.

FIG. 1 shows an example of a conventional radio paging system for performing message communication by radio signals. The system comprises calling apparatuses 1a and 1b which are arranged in different firms A and B respectively, transmitters 2a and 2b which convert message signals supplied from the apparatuses 1a and 1b into radio signals and output the signals, and receivers 3a, 4a, 3b and 4b which are carried by some persons to be paged, respectively. There is not always only one set of transmitters 2a and 2b provided in the firm A or B, but also a plurality of transmitters so as to enlarge the service area. Furthermore, there are not only two receivers 3a and 3b or 4a and 4b provided in each firm A or B, respectively, but also a plurality of receivers in each firm, if necessary.

The above-mentioned radio paging systems for transmitting and receiving the messages by means of radio waves, are divided into two classes, that is, a minute power type of the 400 MHz band or the like, and a low power type of 10 mW or the like.

The advantages of the minute power type system reside in that (a) the constitution of the whole is simple, (b) it is not necessary for users to obtain licenses in some countries, (c) users are able to freely select signal frequencies and transmission bands, and (d) there is little interference where signals affect other electric devices being provided peripherally therewith, though the signals have a short distance for transmission, while the low power type systems have the advantage that transmission distance of signals is longer than minute power type systems.

FIG. 2 shows another example of a conventional radio paging system for transmitting and receiving messages by optical signals. The system comprises a calling apparatus 5a or 5b, into optical signals and transmitting the signals through the air, and optical receivers 7a and 8a or 7b and 8b which are carried by those to be paged.

The conventional systems of light wave signal type have some advantages that (a) as users freely select frequencies and modulation systems of light wave signals converted from the message signals, it is possible to transmit the signals by high-speed and wideband transmission, (b) since partition members such as walls, lockers and so on can prevent leakage of the optical signals from each firm, this type has superior confidentiality, and (c) it is unnecessary for users to obtain licenses in some countries.

The above-mentioned conventional radio paging system, however, has many problems some of which will be described hereinafter.

At first, the minute power paging systems have the problems that (a) as the radio wave signals reach only short distances, it is difficult to provide a service area sufficiently broad for practical use, (b) this type is sensitive to electromagnetic interference (EMI) caused by deterioration of the radio wave environment.

On the other hand, the low power type paging systems also have some problems that the occurrence of a fading in higher frequency bands causes the wave signals to deteriorate, (b) while the wave signals reach long distances, it is impossible to sufficiently ensure confidentiality of communication, (c) as the assigned channels are not sufficiently provided in many countries, users have time limits imposed for use of the systems and have to wait a long time to use them, (d) since users are required to denote the specifications in detail for asking for a license, the selling cost increases, and (e) as the Radio Regulatory Act exercises strict control over the use of radio waves in some countries, paging systems cannot be freely designed and utilized.

Furthermore, the conventional systems of the optical signal type have the problems that (a) it is impossible for the receiver, for instance the receivers 8a and 8b as shown in FIG. 2, which are carried by the person being paged in the shade to receive the message signals even if he is close to the optical transmitter, and (b) the optical signals reach only a short distance in comparison with the low power type paging systems mentioned above.

SUMMARY OF THE INVENTION

The primary object of the present invention is to provide a radio communication system comprising a transmission device which has both an optical transmitter and a radio wave transmitter and a reception device having a plurality of receivers which are capable of taking out the necessary message signals from both optical signals and radio signals, so that privacy of communication is ensured and it is difficult to receive interference from other communication systems.

Another object of the present invention is to provide a radio communication system by using both the optical signals and radio signals as the signals for transmitting messages, so that it is possible to prevent interference to other devices and apparatuses.

In order to achieve the above-mentioned objects, the radio communication system of the present invention comprises a transmission device including a modulation circuit which is supplied with message signals from a calling circuit, an optical transmitter which radiates output signals from the modulation circuit as optical signals, and a transmitter which radiates output signals from the modulation circuit as radio signals; and a reception device for receiving the optical signals and radio wave signals from the transmission device, for combining these signals with each other, and for demodulating the message signals from these signals.

As the radio communication system of the present invention is constructed above, the present invention has some effectiveness in that, confidentiality of communication is surely kept, it is difficult to receive interference from others, and it is possible to prevent interference to others.

The advantage of the present invention resides in that it is possible to transmit messages at high speed without the restrictions of transmission bands in many countries and to decrease manufacturing costs on the basis of greater freedom of design.

Furthermore, the other advantage of this invention resides in that it is possible to excellently transmit messages by preventing jamming elements such as noise and so on, because the phase differences between the optical signal and radio signal do not occur in the case where unification of transmission and reception devices causes the output characteristics at the transmission side and reception side to synchronize.

BRIEF DESCRIPTION OF THE DRAWINGS

In the accompanying drawings:

FIG. 7 is a timing chart indicating demodulating operation in accordance with optical signals in the third embodiment;

FIG. 8 are circuit diagrams showing detailed constructions of transmission devices of a radio paging system of the fourth embodiment according to the present invention, where FIG. 8A designates the connecting state of light emitting diodes in a straight line and FIG. 8B designates the connecting state of the light emitting diodes in a loop line;

FIG. 11 is a circuit diagram showing a radio paging system of the seventh embodiment according to this invention, which connects light emitting diodes in a different straight line;

FIGS. 12 and 13 are characteristics charts showing the wave components of general light emitting diodes;

FIG. 14 is a block diagram showing a reception device of a radio paging system of the eighth embodiment of the present invention;

DETAILED DESCRIPTION OF THE PREFERRED EMBODIMENTS

There will be described preferred embodiments of a radio communication system for transmitting and receiving message data according to the present invention in detail hereinafter, with reference to the accompanying drawings.

Figure 1:
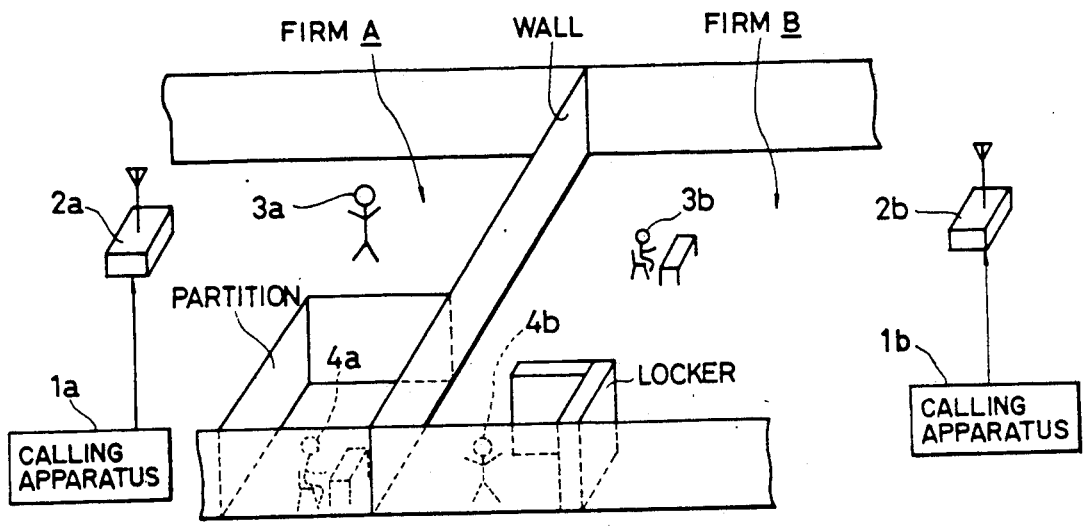
FIG. 1 is a schematically perspective view showing one example of a conventional radio communication systems, for instance, a radio paging system of the weak radio wave type.
Figure 2:
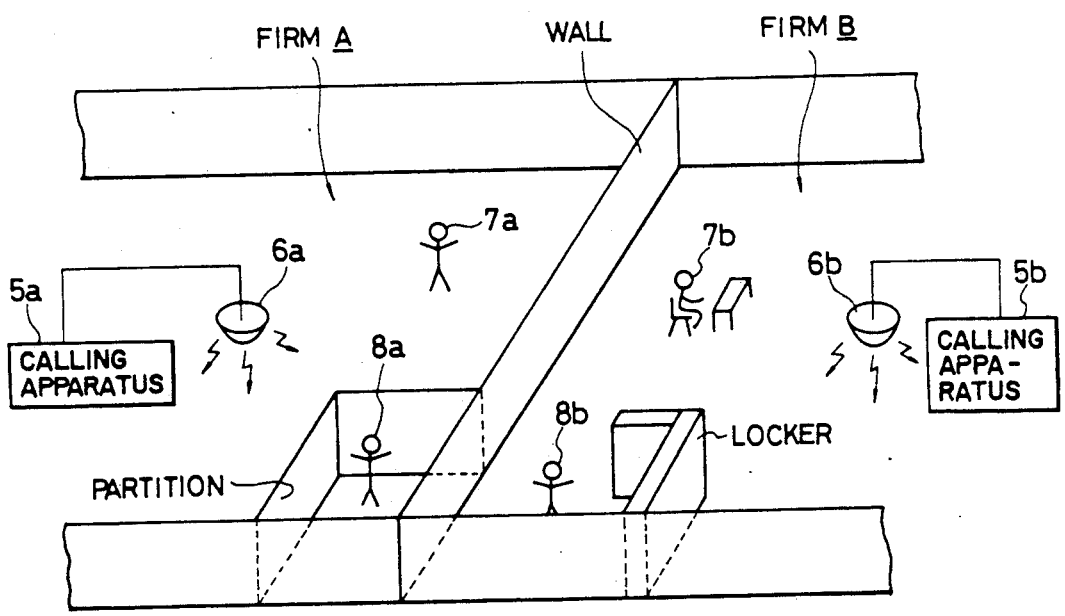
FIG. 2 is a schematic perspective view showing another example of a conventional radio communication system, for instance, a radio paging system of the light wave transmission type.
Figure 3A:
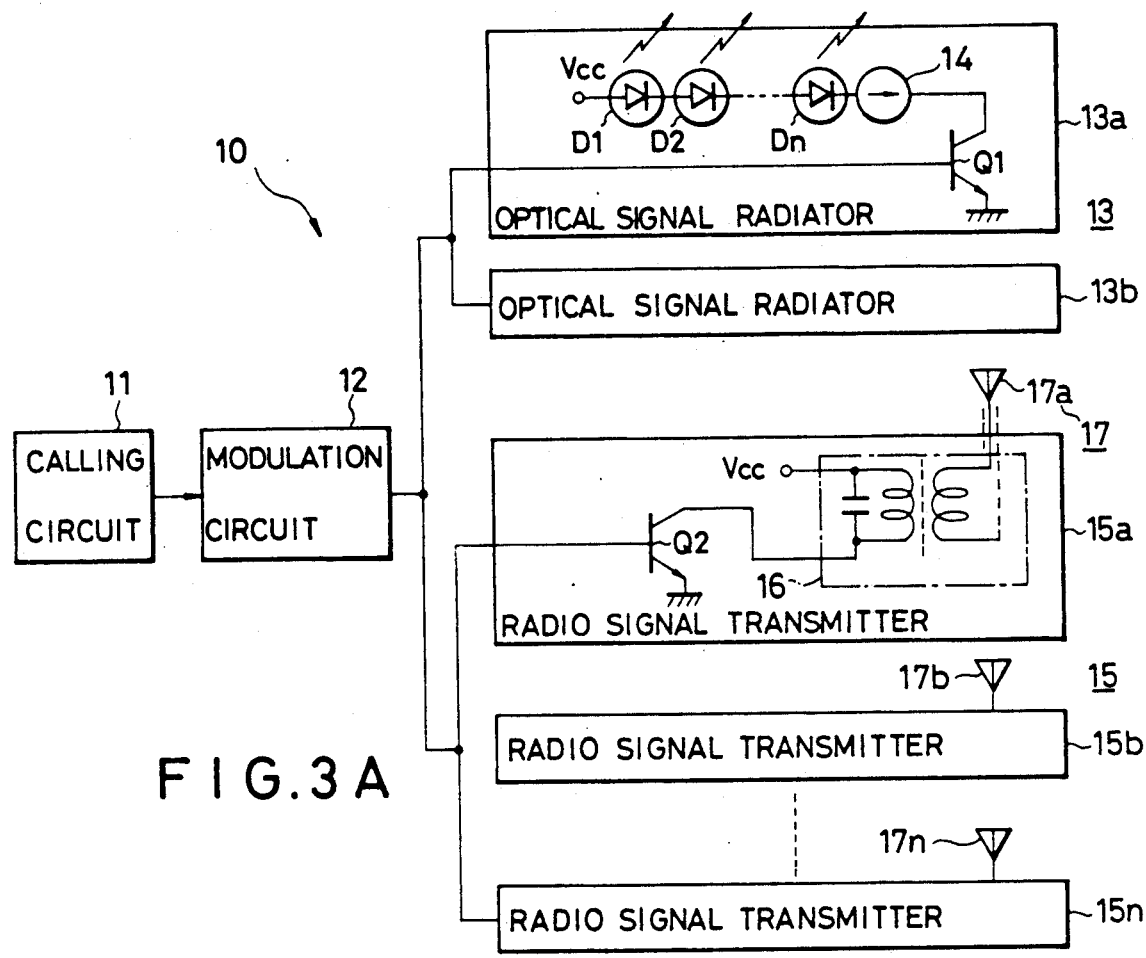
FIG. 3 are block diagrams showing the first embodiment of a radio communication system according to the present invention, where FIG. 3A designates a transmission device and FIG. 3B designates a reception device.

At first, the first embodiment of this invention will be explained in detail in accordance with FIGS. 3A, 3B and 4. FIG. 3A shows a transmission device of the radio paging system of the first embodiment of the present invention. In this figure, the transmission device 10 comprises a calling circuit 11 which converts input message information to message signals and outputs these message signals, a modulation circuit 12 which modulates and outputs predetermined modulation signals on the basis of the message signals output from the calling circuit 11, light wave radiators 13 for converting the modulation signals supplied from the modulation circuit 12 into light wave signals and radiating the light wave signals into the air, and radio signal transmitters 15 for converting the modulation signals supplied from the modulation circuit 12 into radio wave signals and transmitting the radio wave signals.

Each of the radiators 13 comprises a plurality of light emitting diodes D1 to Dn, a constant current source 14, and a switching transistor Q1. Each of the transmitters 15 comprises a transistor Q2 as a tuning amplifier, a resonance circuit 16 for resonating and outputting an output of the transistor Q2, and an antenna for transmitting the output of the resonance circuit 16 into the air. As many radiators 13 are provided, the first and the second radiators are designated by numerals 13a and 13b, respectively. As many transmitters 15 and antennas 17 are also provided, the first, the second and the n-th transmitters 15 or antennas 17 are designated by numerals 15a, 15b and 15n or 17a, 17b, 17n, respectively.

Figure 3B:
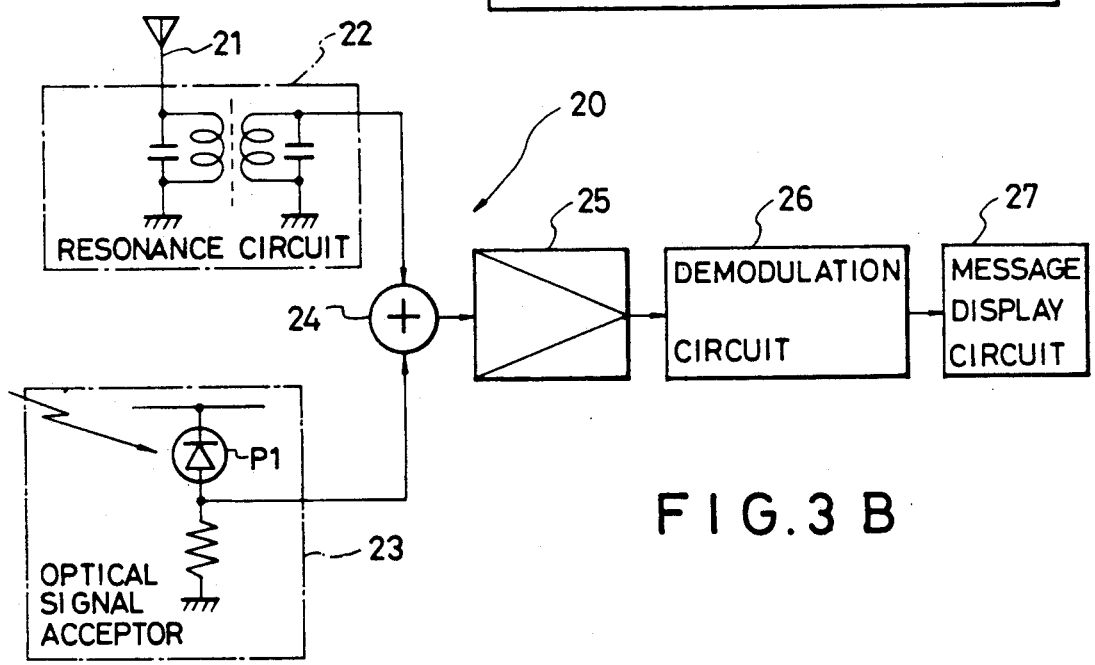

A reception device 20 applicable to the first embodiment comprises, as shown in FIG. 3B, an antenna 21 for receiving the radio wave signals transmitted from antennas 17, a resonance circuit 22 for resonating the received radio waves and extracting the necessary component of the waves, a light wave acceptor 23 for accepting the light wave signals radiated from the radiator 13, an adder 24 as a combination means for adding the necessary component of the radio wave signals and the light wave signals, a tuning amplifier 25 for amplifying an output of the adder 24, a demodulation circuit 26 for demodulating the amplified output into the message signals, and a message display circuit 27 for converting and displaying the message signals as a display output. The acceptor 23 includes a photodiode P1 as an acceptor device and a resistor 23a.

The operation of the radio paging system of the first embodiment will be described with reference to the view of furnishing state of devices shown in FIG. 4.

In an open space such as an office where there are few obstructions such as partition boards, lockers, walls and so on which obstruct optical signals, the communication of messages is performed by optical signals. For this communication, the optical radiator 13a is arranged at substantially the center of the ceiling of the office space. As the radiation output of the radiator 13a is not regulated by law in Japan or other countries, the output can be made sufficiently large. Furthermore, the directivity of the optical signals is set equal in all directions in range of 360 degrees.

By the above arrangement of the transmission device, as the propagation distance of optical signals is longer than that of the weak radio wave signals transmitted from the transmitter 15 at least in an unobstructed view, it is possible for the radiator 13 to provide a message service area which is broader than the transmitter 15. As the optical signals supplied from the radiator 13 are not intercepted by obstructions such as walls dividing the office room, this system is capable of maintaining confidentiality of communication.

On the other hand, the person who is in a rest room, a toilet, a storeroom, or the like where optical signals are intercepted by the optical obstructions such as walls 19, receives the messages by minute radio signals. In order to ensure the communication by the radio signals, as shown in FIG. 4, there are provided the radio transmitters 15a and 15b on the surface of the wall 19 at the side of the office room, which partitions the office room off from the other room. The propagation distance of radio waves from the transmitters 15a and 15b, are designated as service areas 28a and 28b, respectively, by dotted lines in FIG. 4. To maintain the confidentiality of communication, the service areas Sa and Sb are restricted in a firm A.

Figure 4:
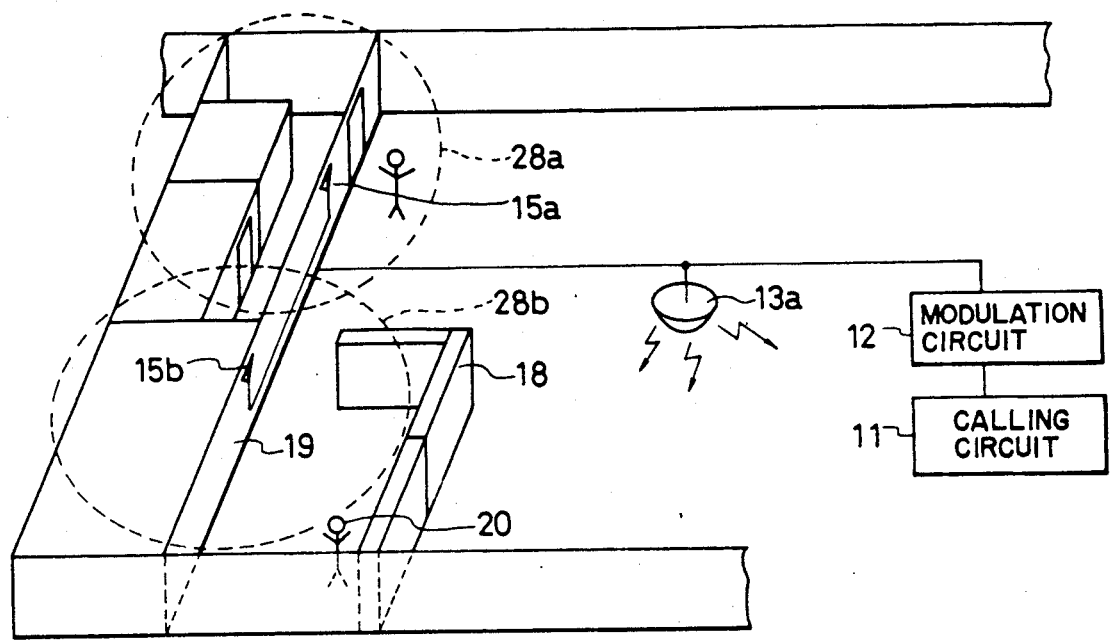
FIG. 4 is a schematic perspective view showing the installed state of the devices as the first embodiment shown in FIG. 3.

As the wall 19 or the like dividing each room is usually formed by material transparent to radio waves, it is sufficient for utilization to arrange only one transmitter or two transmitters as shown in FIG. 4. In the case of the walls 19 being formed by material opaque to radio waves, it is necessary to provide transmitters in every room, for instance, rest rooms, toilets, or storerooms, etc.

The above operation will be described in detail with reference to FIG. 4.

At first, there are described the message transmission with respect to the paged who exists in a space divided by a locker 18, and who has the reception device 20. As the optical signal from the radiator 13a is intercepted by the locker 18, it is impossible to directly reach the paged having the reception device 20. Though optical signals reach the reception device 20 very little by reflection, scattering, and so on, the quantity of information is not enough to transmit the messages. The position of the paged having the reception device 20 is out of both the service areas 28a and 28b where the transmitters 15a and 15b supply the radio signals. Accordingly, the electric field strength of the minute radio signals reaching the reception device 20, is weak too.

Since the reception device 20 held by the paged receives both the light and radio signals with addition, however, in the case of receiving both signals which have the same level and the same phase, it is possible to obtain the message signals increased 3 dB in power by addition of both signals.

Accordingly, it is possible to exactly regenerate the message signals and to definitely transmit the message to the paged having the reception device, on the basis of both signals, even though each signal has an insufficient quantity of information.

Next, there will be described the second embodiment with reference to FIG. 5, which shows a modification of the reception device within the radio communications system of this invention.

Figure 5:
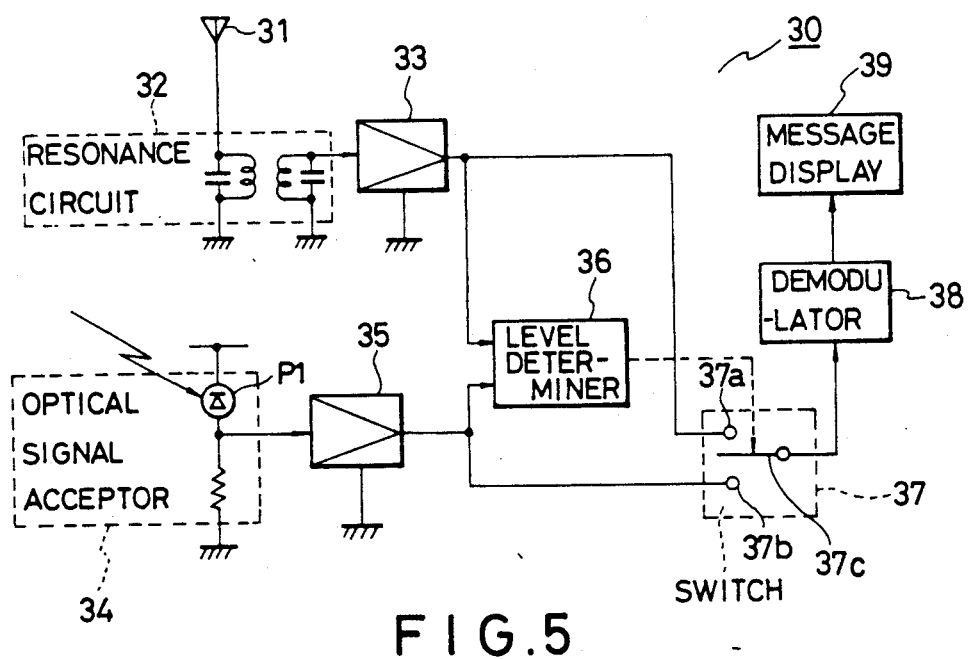
FIG. 5 is a block diagram showing a reception device of a radio paging system of the second embodiment according to the present invention.

A reception device 30 comprises, as shown in FIG. 5, an antenna 31 for receiving the radio signals, a resonance circuit 32 for resonating the radio waves and extracting a necessary component of the waves, a tuning amplifier 33 for tuning and amplifying the output from the resonance circuit, a light wave acceptor 34 for accepting an optical signal from an optical radiator (not shown), a tuning amplifier 35 for tuning and amplifying the output of the acceptor 34, a level determiner 36 for determining which level of two outputs from the tuning amplifiers 33 and 35 is higher, a switch 37 having a fixed contact 37a being supplied the output of the amplifier 33, a fixed contact 37b being supplied the output of the amplifier 35, and a movable contact 37c turning over the fixed contacts 37a and 37b on the basis of the output (a dotted arrow) of the level determiner 36, a demodulator 38 connected with the movable contact 37c, and a message display 39 for displaying the message on the basis of the output from the demodulator 38.

Operation on the basis of the above construction will be described. The level determiner 36 determines which level of both supplied signals is higher and turns over the switch 37 in the manner that the higher level signal is fed to the movable contact 37c. By this switching operation, the high level signal, that is, a signal having better receiving condition is supplied to the demodulator 38.

The radio communications system according to the second embodiment of this invention, is capable of exactly receiving the message signals without harmful influences such as the propagation distortion and the phase difference between the optical and radio signals, which become problems when the system according to the first embodiment adds the radio signal and the optical signal.

However, the switching operation may be performed on the basis of not only the levels of both signals but also on the distortion condition as one modification.

Figure 6:
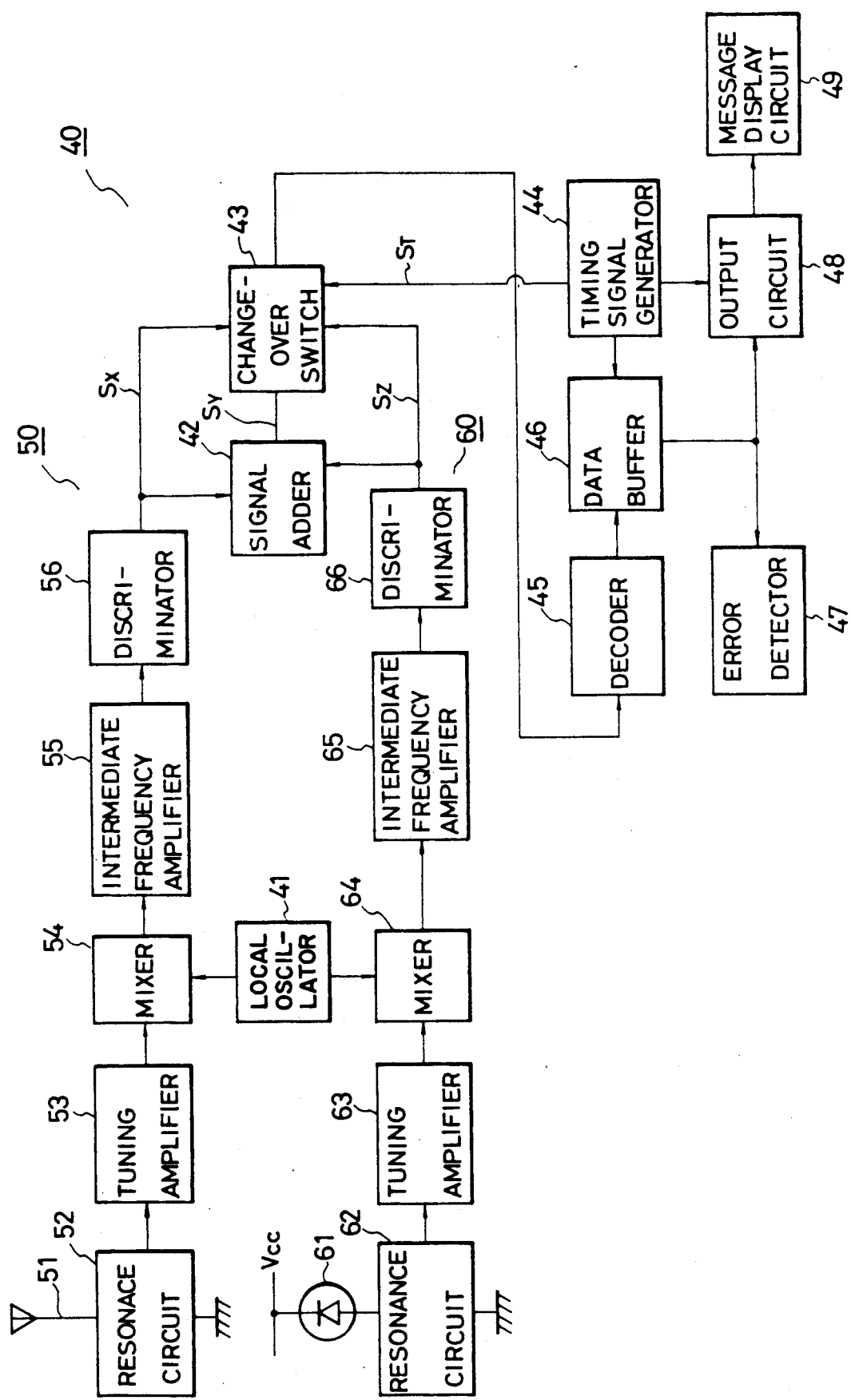
FIG. 6 is a block diagram showing a reception device of a radio paging system of the third embodiment according to the present invention.

The third embodiment according to this invention is shown in FIGS. 6 and 7, which has both functions of the reception devices 20 and 30 in the first and second embodiments, and adopts frequency shift keying (designated as FSK hereinafter) as the system for modulating the message signals. In FIG. 6, a reception device 40 adds the radio and optical signals which are received one by one, or changes over the radio signals, optical signals, and adding signals on the basis of the predetermined timing signal, thereby to display the message signals.

The reception device 40 schematically comprises a radio signal receiving portion 50 for receiving the radio wave signals and converting the received signals into desired signals, an optical signal receiving portion 60 for receiving the optical signals and converting the received signals into desired signals, and a signal addition conversion portion (shown by numerals 42 to 49) for adding and converting both the signals which are received and converted.

The radio signal receiving portion 50 which has the usual construction of a superheterodyne FSK signal reception system, comprises an antenna 51 for receiving the radio signals, a resonance circuit 52 for extracting the necessary component from the radio signals received by the antenna 51, a tuning amplifier 53 for tuning and amplifying the output of the resonance circuit 52, a mixer 54 for mixing the output of the amplifier 53 and the signal from a local oscillator 41 and generating an intermediate frequency signal, an intermediate frequency amplifier 55 for amplifying the intermediate frequency signal, and a discriminator 56 for discriminating and converting the FSK signals amplified by the amplifier 55 into baseband signals Sx.

The light signal receiving portion 60 comprises a photodiode 61 for accepting the light wave signals, a resonance circuit 62 for extracting the necessary component from the light wave signals accepted by the photodiode 61, a tuning amplifier 63 for tuning and amplifying the output of the resonance circuit 62, a mixer 64 for mixing signals of the local oscillator 41 and the amplifier 63 for generating the intermediate frequency signal, an intermediate frequency amplifier 65 for amplifying the intermediate frequency signal, and a discriminator 66 for discriminating and converting the FSK signals amplified by the amplifier 65 into baseband signals Sz.

The signal addition and conversion portion comprises a signal adder 42 for adding the baseband signals Sx and Sz, respectively, output from the discriminators 55 and 65 to generate the third baseband signal Sy, a changeover switch 43 for receiving the baseband signals Sx, Sy and Sz and selecting any baseband signal on the basis of the predetermined timing, a timing signal generator 44 for supplying the predetermined timing signal to the changeover switch 43, a decoder 45 for decoding any baseband signal selected by the switch 43, a data buffer 46 being supplied with the timing signal and decoded signal as an output from the decoder 45, an error detector 47 for detecting errors in the output of the data buffer 46, an output circuit 48 for output of a message signal on the basis of the timing signals and the output of the data buffer 46, and message display circuit 49 for displaying the message signal supplied from the output circuit 48.

Operation of the third embodiment having the above construction will be described with reference to FIG. 7 (a) to (c).

It would be unnecessary to specifically describe the operation in which the radio signal receiving portion 50 and light signal receiving portion 60 generate the baseband signals Sx and Sz, respectively.

The following explanation will mainly concern the operation of the signal addition and conversion portion. The timing signal generator 44 outputs the timing signal having regular intervals shown in FIG. 7(a) to the changeover switch 43. The switch 43 selects cyclically any baseband signal from three signals Sx to Sz which are supplied from the discriminator 56, the adder 42 and the discriminator 66, respectively, on the basis of the timing signal, and supplies the selected baseband signal to the decoder 45. Once the output signal of the decoder 45 is stored in the data buffer 46, the buffer 46 supplies three data units, that is, the radio signal decoded component, the optical signal decoded component, and the added component, to the error detector 47 on the basis of timing signal ST from the generator 44. The error detector 47 only outputs the proper data unit to the output circuit 48 which supplies the message signal to the message display circuit 49, so that the circuit 49 is capable of displaying the message.

There will be obtained the specified effects hereinafter by the first to third embodiments as described above.

(a) It is possible to obtain a broader service area while maintaining confidentiality of communications;

(b) As the radio signal is minute, there is little influence exerted upon other systems and devices;

(c) As signals, for which legal regulation are few in many countries, are used, the transmission bands are not restricted, and it is possible to transfer the message at high speed; and (d) As the systems can be freely designed, it is possible to provide the systems at low manufacturing costs.

It is unnecessary for the radio and light signals to be transmitted by the same frequency and transmission type. For example, the radio signals are transmitted by minimum shift keying (MSK) modulation by using a carrier signal having 100 MHz, while the light signals are transmitted by PSK modulation by using a carrier signal of 1 MHz.

In this case, the reception device adds or converts the light and radio signals after the device demodulates several signals separately.

Next, there will be described the fourth embodiment of the radio communication system according to this invention with reference to FIGS. 8A and 8B. The fourth embodiment provides a transmission device having two functions for transmitting the radio signals and radiating the light signals without providing the radio wave transmitters and the light wave radiators separately.

A transmission device 70 comprises, as shown in FIG. 8A, a diode loop 71 having a plurality of light emitting diodes D1 to Dn connected to each other into a loop, a constant current source 72 which is connected with the loop 71, an NPN-type transistor 73 which is connected with the source 72 through its collector electrode in order to perform the switching operation, a modulator 74 which is connected between a base electrode and emitter electrode of the transistor 73, and a constant voltage power supply 75 which is connected between the diode loop 71 and the connection point of the transistor 73 and modulator 74. The diodes D1 to Dn are arranged at regular intervals of distance d.

When a constant current of I amperes (A) is supplied to the device, that is, the current of IA flows into the current loop having an area of S square meters (m²), a radiation field Eφ occurs at a point of sufficiently far distance Y from the loop, the point existing on a line which makes an angle θ perpendicular to the plane defined by the loop at the center thereof, as expressed by the following equation when the circumferential length of the loop is sufficiently small in comparison with a wavelength λ within the medium:

$$E\phi = 120\sqrt{Ms/\epsilon s}\, n^2\, IS\, (e^{-jkr}/r\lambda^2) \sin\theta\ [V/m]$$

$kr > 1$, $k = 2n/\lambda$, $\epsilon s$ denotes a relative permittivity, and Ms denotes a relative permeability.

Accordingly, the strength of radiation field Eφ may be controlled by changing the area S of the current loop 71 having the light emitting diodes D1 to Dn. It is easy to change the area S by regulating the connecting intervals (each distance d) of diodes.

Therefore, the transmission device 70 according to the fourth embodiment is capable of transmitting the radio and optical signals into the air at the same time after converting the signals supplied from the modulator 74 into the radio and optical signals. Accordingly, as it is possible to transmit the radio and optical signals from the same point, the phase difference between two signals does not occur, so that it is suitable to combine this transmission device 70 with the reception devices described in the first to third embodiments.

Furthermore, as it is unnecesary to provide the radio signal transmitter and the light signal transmitter separately, it is possible to reduce the manufacturing costs such as the material cost, the cost of construction and so on.

Though the fourth embodiment has the diode loop 71 including a plurality of light emitting diodes D1 to Dn connected in a loop shape, the modification of the fourth embodiment, which has a diode line 77 of a plurality of light emitting diodes D1 to Dn connected in a straight line, obtains the same effect on the basis of the same operation by the above equation.

Figure 9:
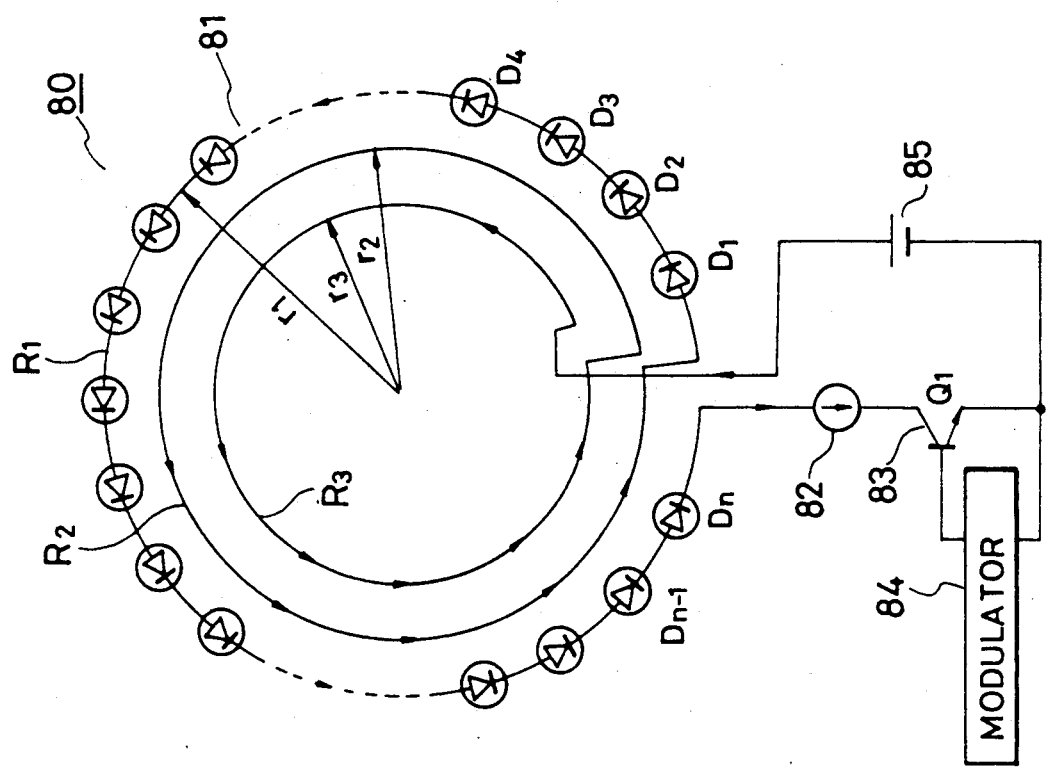
FIG. 9 is a circuit diagram showing a radio paging system of the fifth embodiment according to this invention, which connects a plurality of light emitting diodes in some loops having different diameters.

Furthermore, in order to obtain a stronger radiation field, it is good to connect a plurality of light emitting diodes in some loops as shown in FIG. 9 by the fifth embodiment.

A transmission device 80 of the fifth embodiment comprises, a diode loop 81, a constant current source 82, a transistor 83 for switching, a modulator 84, and a constant voltage power supply 85. The diode loop 81 comprises a loop pattern R1 for connecting a plurality of light emitting diodes D1 to Dn and having a radius r1, and two auxiliary loop patterns R2 and R3 which are shaped in concentric circles having different radii r2 and r3 (r1>r2>r3), respectively.

In the above construction, the current flows in each loop pattern R1, R2 or R3 in the same and counterclockwise direction, and therefore, the directions of the radiation field caused by patterns R1, R2 and R3 are the same, so that it is possible to strengthen the radiation field of the transmission device 80 as a whole. Furthermore, it is possible to adjust the strength of the radiation field by changing the numerical value of radii r1, r2 and r3 of the patterns R1, R2 and R3, respectively.

In the case opposite to the above fifth embodiment, where the radiation field is too strong and it is impossible to reduce the current I flowing in the light emitting diodes which defines the strength of the light wave signals, a plurality of light emitting diodes are connected in the loop patterns of the sixth embodiment.

Figure 10:
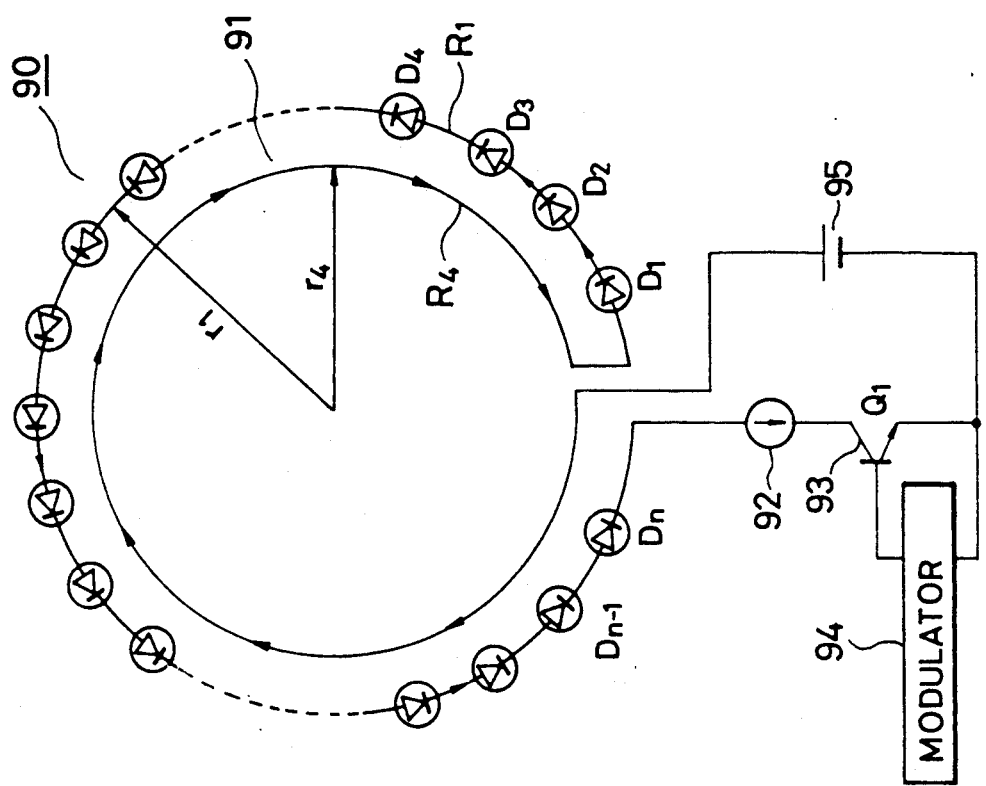
FIG. 10 is a circuit diagram showing a radio paging system of the sixth embodiment according to this invention, which connects light emitting diodes in a different loop.

As shown in FIG. 10, a transmission device 90 comprises a diode loop 91, a constant current source 92, a transistor 93 for switching, a modulator 94, and a constant voltage power supply 95. The diode loop 91 includes a circular connection pattern R1 having a radius r1, and a cancel pattern R4 being provided in the pattern R1 and having a radius r4 (r1>r4).

The current of the cancel pattern R4 flows clockwise in the opposite direction of the current of the pattern R1, so that the radiation field caused by the pattern R4 is opposite to the field caused by the pattern R1. Accordingly, it is possible to weaken the strength of the radiation field of the transmission device 90 as a whole, while the strength of the light wave signals is kept unchanged. The strength of the field is capable of being adjusted by changing the numerical value of the radius r4 of the cancel pattern R4.

The seventh embodiment is shown in FIG. 11 as the modification which is provided to weaken the radiation field. By the seventh embodiment, a transmission device 100 comprises a diode connection pattern 101 in which light emitting diodes D1 to Dn are connected in a straight line, a constant current source 102, a transistor 103, a modulator 104, and a constant voltage power supply 105. In the above circuitry, a return pattern h1 is provided along a part h of the diode connection pattern 101. The return pattern h1 is formed in concrete by the wire which is closely adhered to the part h of the pattern 101 through an insulation member.

As the transmission device 100 of the seventh embodiment is constituted as above, it is easy to narrow an area S of the current loop while keeping the connection distance d between adjacent diodes similar to the fourth embodiment shown in FIG. 8B, so that it is possible to weaken the radiation field caused by the diode line of the connection pattern 101 by this seventh embodiment.

The following can be commonly said from the fourth through the seventh embodiments. Generally, the light emitting diodes are driven by a rectangular wave, as shown in FIG. 12, which has a period $T_1$ ($T_1=1/f_1$). When the diodes are driven by the rectangular wave, there occurs the so-called EMI components from the transmission device, as shown in FIG. 13, which are an electromagnetic wave component (radio signal) as unnecessary radiations. The harmonic components in the EMI components also include information signals which are useful to transfer the messages. Accordingly, at a transfer of information, the communication system is capable of communicating the information by not only the fundamental wave, but also by the addition of the harmonic waves to the fundamental wave, or by only the harmonic wave components.

There will be described in detail the eighth to the eleventh embodiments with reference to FIGS. 14 to 18, which relates to communication systems of the type also receiving the harmonic wave components in addition to the fundamental wave.

In FIG. 14 showing the communication system according to the eighth embodiment, a reception device 110 is schematically comprised of a radio signal receiving portion 111, a light signal receiving portion 121, and a message signal reproducing portion 125. The radio signal receiving portion 111 comprises an antenna 112, a resonance circuit 113 for extracting the fundamental wave component, a tuning amplifier 114 for tuning and amplifying the extracted fundamental wave component, a resonance circuit 115 for extracting a harmonic wave component such as the third harmonic from the radio wave signals received by the antenna 112, a tuning amplifier 116 for tuning and amplifying the third harmonic wave, a ⅓ countdown circuit 117 for changing the frequency of the third harmonic wave back to the same frequency of the fundamental wave, a delay circuit 118 for delaying the harmonic wave after the frequency conversion, an adder 119 for adding the fundamental and harmonic component, and a demodulator 120 for demodulating the added radio wave signals.

On the other hand, the optical signal receiving portion 121 comprises a photodiode 122 as a light acceptor, a tuning amplifier 123 for tuning and amplifying the optical signals accepted by the photodiode 122, and a demodulator 124 for demodulating the optical signals.

The message signal reproducing portion 125 comprises a level determiner 126 for determining which level of the radio signals output from the demodulator 120 and optical signals from the demodulator 124 is higher, and a multiplier 127 for performing the multiplication of the radio and optical signal output from the demodulators 120 and 124, respectively, and the determination output from the level determiner 126.

According to the eighth embodiment as mentioned above, as the harmonic wave component adds to the fundamental wave component, it is possible to favorably receive the message signals in comparison with receiving only the fundamental component of radio wave signals.

Though the eighth embodiment provides the reception device for adding only the specified frequency harmonic wave, in actuality, only the third harmonic wave, the present invention is applicable to the ninth embodiment.

Figure 15:
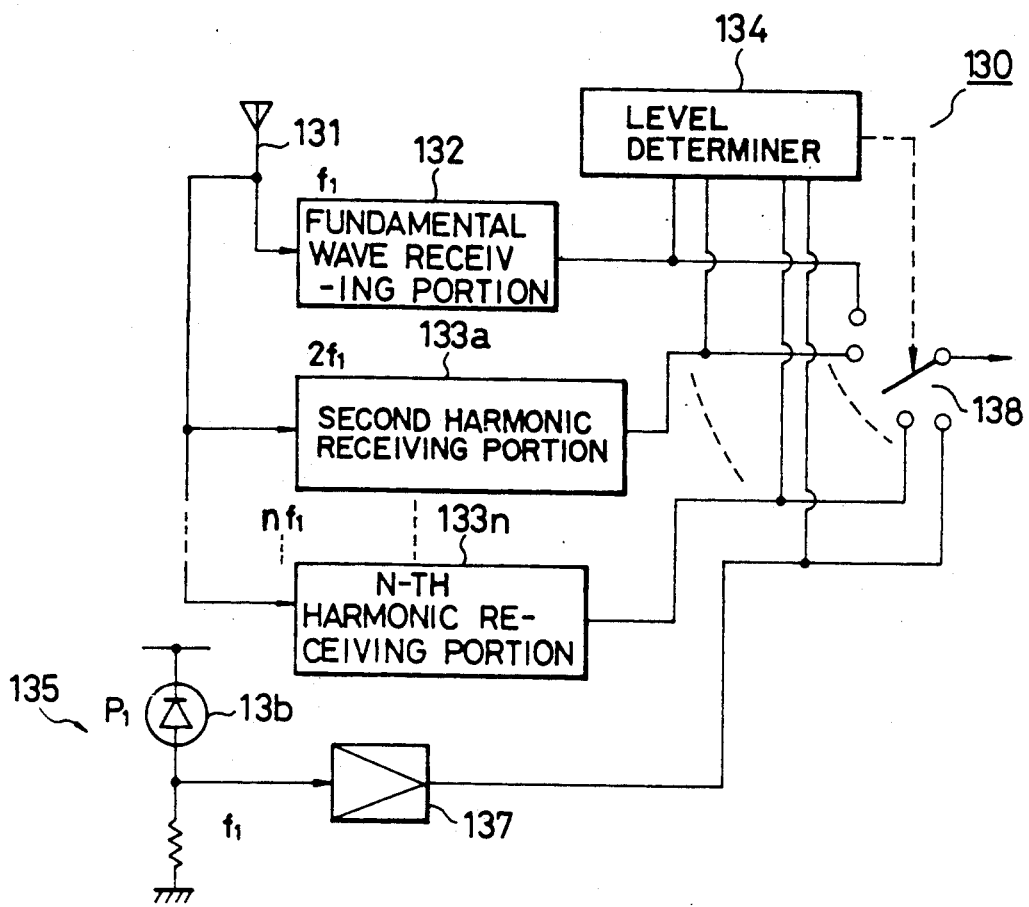
FIG. 15 is a block diagram showing a reception device of a radio paging system of the ninth embodiment of the present invention.

The reception device 130 according to the ninth embodiment comprises, as shown in FIG. 15, an antenna 131 for receiving the radio signals, a fundamental wave receiving portion 132 for extracting the fundamental component from the radio signals received by the antenna 131, harmonic wave receiving portions 133a to 133n for extracting the second to the n-th harmonic components, respectively, a level determiner 134 for determining which level of the radio signals output from each of the receiving portions 132 and 133a to 133n is the highest, and for controlling a signal changeover switch 138 as will be described later, a light acceptor 135 comprising a photodiode 136 and a tuning amplifier 137, and the signal changeover switch 138 for selecting the highest level signal of the outputs from the radio waves receiving portions 132 and 133a to 133n and the tuning amplifier 137 of the light acceptor 135, on the basis of the output from the level determiner 134 and for outputting the highest level signal to a decoder (not shown).

As the reception device 130 according to the ninth embodiment has the above constitution, it is possible to receive the signals definitely, and to reproduce the message signal in spite of interference of the signal or signals having the specified frequency or a plurality of frequencies. For example, even though the fundamental wave and the third harmonic wave of the radio signals suffer from interference, it is possible to receive the message signal definitely by means of the optical signal or other harmonic wave on the basis of the changeover operation of the switch 138.

Figure 16:
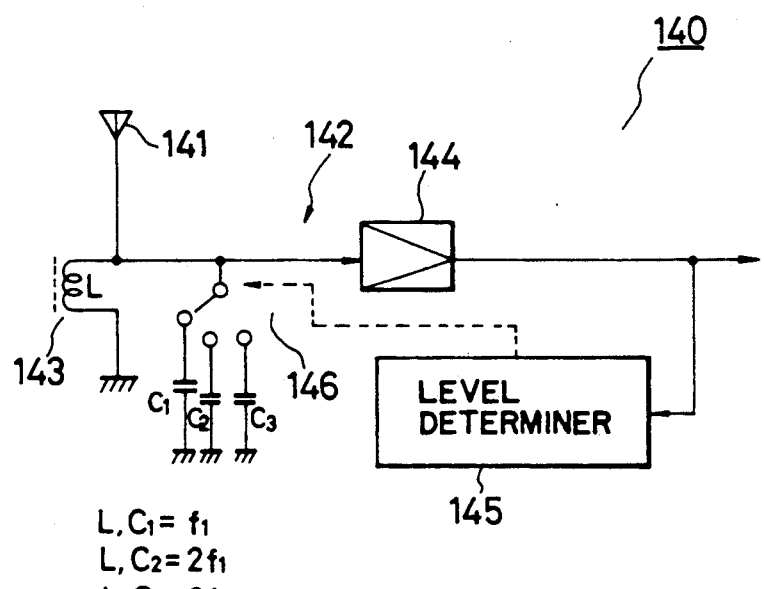
FIG. 16 is a block diagram showing a reception device of a radio paging system of the tenth embodiment of the present invention.

FIG. 16 shows the reception device according to the tenth embodiment of the present invention. The reception device 140 in the tenth embodiment, which is different from the reception device 130 having a plurality of radio receiving portions in the ninth embodiment shown in FIG. 15, extracts the message signal by means of only one receiving portion 142 from the signals received by an antenna 141. The receiving portion 142 comprises, as shown in FIG. 16, a resonance circuit 143 for resonating the received signal by the antenna 141 and for extracting the necessary component from the signal, an amplifier circuit 144 for amplifying an output of the resonance circuit 143, a level determiner 145 for determining which output level of the amplifier circuit 144, is the highest and a tuned point selection circuit 146 for selecting the highest frequency on the basis of output from the level determiner 145 by shifting in order to a tuned point having capacitors $C_1$ to $C_3$, respectively.

It is possible for the tenth embodiment to accurately reproduce the message information by the same manner as the ninth embodiment in spite of interference for the signal having the specified frequency.

The eleventh embodiment will be described with reference to FIGS. 17 and 18, which uses wirings for PA and paging in common.

There are generally provided calling devices such as a public-address (system) by wiring (designated as PA devices hereinafter) in firms and factories. Message signals such as voice signals, are supplied to a PA (public-address) amplifier through a microphone in such a PA device. The message signals are further transmitted from the PA amplifier to speakers provided in respective rooms through flat cable.

Figure 17:
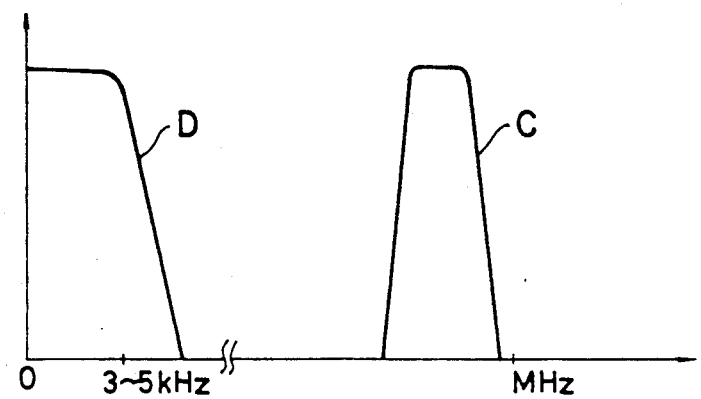
FIG. 17 is a characteristic chart showing the frequency distribution of modulated signals in the tenth embodiment of this invention.
Figure 18:
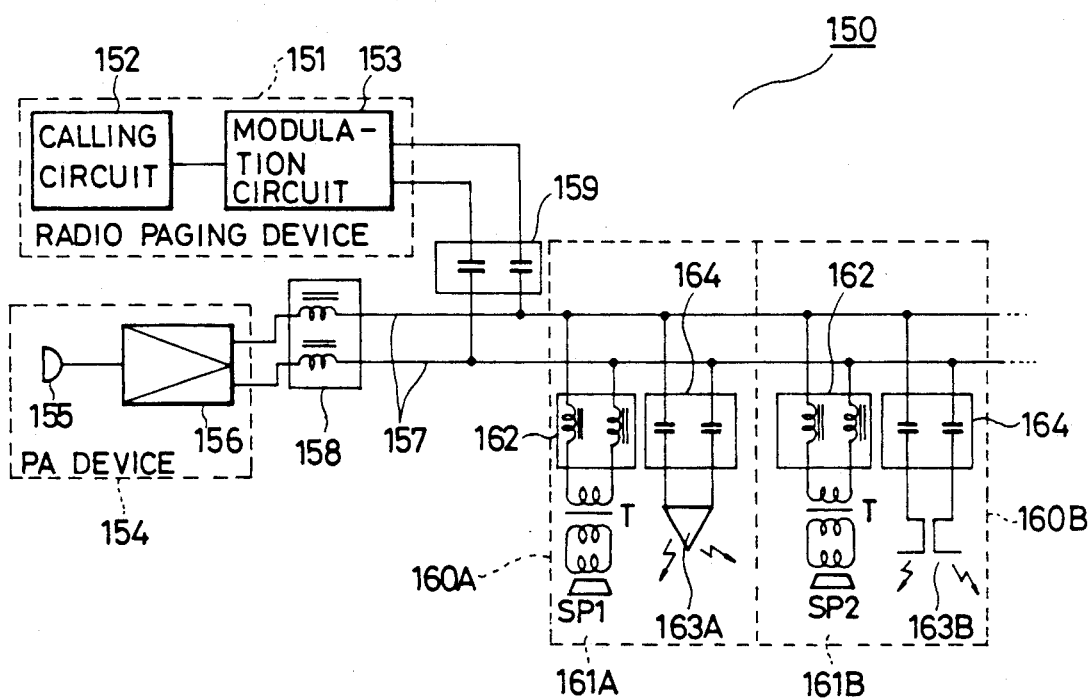
FIG. 18 is a block diagram showing a concrete construction of a transmission device of the eleventh embodiment of the present invention.

The voice signals supplied by the microphone, as shown in FIG. 17, only have a frequency bandwidth of a few kHz. However, the longer the total extended distance of the flat cable, the greater the resistance. Therefore, the audio signals are output from the PA amplifier at a high impedance of a few kΩ. The signals output from the PA amplifier are converted into a low impedance signal by means of a transformer provided for each speaker.

As above-mentioned, in the radio paging system, the modulator circuit modulates a carrier wave having a frequency from a few hundred kHz to a few MHz by the phase shift keying (PSK) or the minimum shift keying (MSK) modulation by the message signals.

The modulated signal of the radio paging system and the voice signal of the PA device have the spectrum C and D shown in FIG. 17, respectively. By properly separating the bands of the modulated wave and voice signals, it is possible to transmit the modulated signals of the radio paging device through the flat cable of the PA device.

The device of the eleventh embodiment is designed on the basis of the above principle. In FIG. 18 showing the concrete constitution of the eleventh embodiment, a transmission device 150 schematically comprises a radio paging device 151 and a wired PA device 154. The radio paging device 151 has a calling circuit 152 and a modulation circuit 153. The modulation circuit 153 is supplied with message signals from the calling circuit 152. The PA device 154 comprises a microphone 155 and a PA amplifier 156. The PA (public address amplifier 156 is supplied with the output from the microphone 155. The transmission device 150 further comprises a flat cable 157, a low pass filter (LPF) 158 consisting of coils and being connected between the amplifier 156 and the flat cable 157, and a high pass filter (HPF) 159 consisting of capacitors and being connected between the modulation circuit 153 and the flat cable 157.

The modulation circuit 153 and the HPF 159 are designed to be balanced to the feeder lines 157 with the impedance matching in the band of the modulated signal, while the LPF 158 is designed to have sufficiently high impedance against the modulated signal.

Calling devices 160A and 160B, which are provided for rooms A and B respectively, are connected to the flat cable 157 in parallel. The calling device 160A comprises the first PA speaker 161A, and LPF 162 being provided between the speaker 161A and the flat cable 157, a light wave radiator 163A as a wireless calling device, and an HPF 164 being provided between the radiator 163A and the flat cable 157. The calling device 160B for room B is also constituted in the same manner as the calling device 160A.

As the transmission device 150 of the eleventh embodiment is constituted as described above, the wiring for PA speaker device can be used in common as lines for the supplying modulated signals from the modulation circuit to the radiator 163A and transmitter 163B. Accordingly, in the case that the transmission device is equipped in the office room or the like where the wirings for the PA device have already and completely been equipped, it is not necessary to provide new wirings at all, so that it is possible to reduce the cost of wiring work and to reduce the wiring space required for wiring.

When the carrier frequency from the modulator of the transmission device is not so high, for example, it is less than 500 kHz, it is possible to use the metallic wires in common instead of the flat cable, but it is necessary to pay attention to the impedance matching and balance condition in view of interference by electromagnetic waves.

In the case where the PA device is wired by coaxial cables, it is possible to set the carrier frequency of the radio paging device to be sufficiently high.

Though both the transmission and reception devices transmit and receive the message by one-way communication in every embodiment from the first to the eleventh, it hardly needs to be said that two-way message communication can also be performed.

I claim:

1. A radio communication system for data transmission and reception, which is comprised of a transmission device and a reception device; wherein
said transmission device comprises a modulation circuit supplied with message signals from a calling circuit, a radio signal transmitter for transmitting output signals of the modulation circuit, through the air waves, after converting the output signals into radio wave signals, and an optical signal radiator for radiating the output signals of the modulation circuit, through air, after converting the output signals into light wave signals; and
said reception device comprises means for receiving said radio wave signals transmitted by said radio signal transmitter, means for detecting and converting said light wave signals radiated by said optical signal radiator into electrical signals, means for combining said RF signals and said converted light wave signals in order to reproduce said message signals, means for demodulating said message signals from the combined signals, and means for displaying the demodulated message signals.

2. A radio communication system according to claim 1; wherein
said transmitter and said optical radiator are constructed as a signal output unit, said optical radiator comprising a plurality of luminous devices connected in series to form a loop antenna, said transmitter and optical radiator simultaneously emitting the radio wave signals and the light wave signals, respectively, into the air on the basis of current flowing in said luminous devices.

3. A radio communication system according to claim 1; wherein
said optical signal radiator comprises a plurality of light emitting diodes for radiating said light wave signals, a constant current source, and a switching transistor, all of which are connected in series;
said radio signal transmitter comprises a transistor as a tuning amplifier, a resonance circuit for resonating an output of the transistor, and an antenna for outputting said radio wave signals; and
said reception device comprising a receiving antenna as said means for receiving said radio wave signals from said antenna of said transmitter, said reception device further comprising a resonance circuit for resonating the received radio wave signals and extracting a necessary frequency component from said radio wave signals, an optical signal detector as said means for detecting and converting and having a photodiode and resistor, said means for combining comprising an adder for adding said necessary component of the radio wave signals and said light wave signals, said reception device further comprising a tuning amplifier for tuning and amplifying an output from said adder, said means for demodulating comprising a demodulation circuit for demodulating an output of said tuning amplifier to reproduce said message signals, and said means for displaying comprising a message display circuit for displaying the reproduced messages.

4. A radio communication system according to claim 1, wherein said reception device comprises:
a receiving antenna as said means for receiving said radio wave signals,
a resonance circuit for resonating the received radio wave signals and extracting a necessary frequency component of the signals,
a first tuning amplifier for tuning and amplifying the necessary frequency component of the radio wave signals,
an optical signal detector as said means for detecting and converting having a photodiode and resistor for detecting and converting the light wave signals,
a second tuning amplifier for tuning and amplifying the and converted light wave signals,
a level determining circuit connected to received outputs of said first and second tuning amplifiers and for generating a changeover signal indicative of which of the amplified radio wave signal or the amplified converted light wave signal is higher in amplitude, and
a changeover switch for selecting one of said amplified radio or amplified converted light wave signals on the basis of said changeover signal to be output to the means for demodulating.

5. A radio communication system according to claim 1; and further comprising a radio signal receiving portion for processing the radio wave signals and an optical signal receiving portion for processing the light wave signals; wherein
said radio signal receiving portion comprises an antenna as said means for receiving, a first resonance circuit for extracting a necessary frequency component from the received radio wave signals, a first tuning amplifier for tuning and amplifying an output of said first resonance circuit, a first mixer for mixing signals of said first tuning amplifier and a local oscillator to generate a first intermediate frequency signal, a first intermediate frequency signal amplifier for amplifying the first intermediate frequency signal, and a first discriminator for discriminating and converting frequency shift keying (FSK) signals amplified by said first intermediate amplifier into first baseband signals;
said optical signal receiving portion comprises a photodiode for detecting and converting the light wave signals, a second resonance circuit for extracting a necessary frequency component from the detected and converted light wave signals, a second tuning amplifier for tuning and amplifying an output of said second resonance circuit, a second mixer for mixing signals of said second amplifier and said local oscillator to generate a second intermediate frequency signal, a second intermediate frequency signal amplifier for amplifying the second intermediate frequency signal, and a second discriminator for discriminating and converting FSK signals amplified by said second intermediate frequency signal amplifier into second baseband signals; and said means for combining comprising a signal adder for adding said first and second baseband signals to generate a third baseband signal, a changeover switch receiving each of said first, second and third baseband signals for selecting as output one of said first, second and third baseband signals on the basis of a predetermined timing signal, a timing signal generator for generating said predetermined timing signal, a decoder receiving the output of the changeover switch for decoding the selected baseband signals, a data buffer for storing the decoded baseband signal on the basis of said timing signal, an error detector for detecting errors in an output of said buffer, an output circuit for generating as output message signals on the basis of said timing signal and output of the data buffer.

6. A radio communication system according to claim 2; wherein said signal output unit comprises a diode loop having a plurality of light emitting diodes connected to each other in a loop, a constant current source connected with said loop, a transistor connected to said constant current source, a modulator connected between a base and an emitter of said transistor, and a constant voltage power supply connected between said diode loop and the emitter of said transistor.

7. A radio communication system according to claim 6; wherein said diode loop comprises a substantially circular primary loop pattern having a radius r1 and a plurality of light emitting diodes arranged at regular intervals, and two auxiliary loop patterns provided concentrically within said primary loop pattern and have radii r2 and r3, respectively, with r1>r2>r3; and said primary loop pattern and said auxiliary loop patterns have the same current flowing therethrough in the same direction.

8. A radio communication system according to claim 6; wherein said diode loop comprises a circular connection pattern provided at a radius r1 and having a plurality of light emitting diodes arranged at regular intervals, and a cancel pattern provided concentrically within said circular pattern having a radius r4 smaller than the radius r1; and said circular pattern having a current flowing therethrough in a first direction, while said cancel pattern has a current flowing therethrough in a second direction opposite to the first direction.

9. A radio communication system according to claim 2; wherein said signal output unit comprises a connection pattern having a plurality of light emitting diodes connected to each other in a straight line, a constant current source connected with said line of light emitting diodes, a transistor connected to said constant current source, a modulator connected between a base and an emitter of said transistor, and a constant voltage power supply connected between said pattern and the emitter of said transistor.

10. A radio communication system according to claim 9; wherein said connection pattern further comprises a return pattern being formed by a wire closely adhered to a part of said straight line through an insulation member.

11. A radio communication system according to claim 1; wherein said reception device comprises a radio signal receiving portion, an optical signal receiving portion, and a message signal reproducing portion as said means for combining;

said radio signal receiving portion comprises an antenna as said means for receiving, a resonance circuit for extracting a fundamental wave component of the radio signal, a tuning amplifier for tuning and amplifying the extracted fundamental wave component, a second resonance circuit for extracting a third-harmonic wave component of the radio signal, a second tuning amplifier for tuning and amplifying the extracted third-harmonic wave component, a ⅓ countdown circuit for changing a frequency of said third-harmonic component to the same frequency as said fundamental wave, a delay circuit for delaying the third-harmonic wave, an adder for adding said fundamental and third-harmonic component, and a demodulator for demodulating the added components to generate a demodulated radio signal;

said optical signal receiving portion comprises a light acceptor as said means for detecting and converting, a tuning amplifier for tuning and amplifying optical signals accepted and converted by said acceptor, and a demodulator for demodulating said optical signals into said converted light wave signals; and said message signal reproducing portion comprises a level determiner for determining which of said demodulated radio signals and the converted light wave signals is higher in amplitude and generating a determination signal representative thereof, and a multiplier for multiplying said demodulated radio signals, said converted light wave signals, and the determination signal of said level determiner.

12. A radio communication system according to claim 1; wherein said reception device comprises an antenna as said means for receiving radio signals, a fundamental wave receiving portion for extracting a fundamental component from the received radio signals, a plurality of high-harmonic wave receiving portions for extracting a second to an n-th high-harmonic component of the received radio signal, respectively, a photodiode for accepting optical signals as said means for detecting and converting, a tuning amplifier for tuning and amplifying the received optical signals, a level determination circuit for determining output levels of each of said fundamental and high-harmonic components of said radio signals and said received optical signals, and a changeover switch for selecting and outputting the highest level signal of said received optical signals and said fundamental and high-harmonic components of said radio signal.

13. A radio communication system according to claim 1; wherein
said reception device comprises an antenna as aid means for receiving radio signals, a resonance circuit for resonating the received radio signals and extracting necessary components of said radio signals, an amplifier circuit for amplifying said radio signals, a level determination circuit for determining output levels of said amplifier circuit, and a tuned points selection circuit for selecting the highest frequency of said radio signals on the basis of the output of said level determination circuit by shifting in order a tuned point of a plurality of points.

14. A radio communication system according to claim 1; wherein
said transmission device comprises a radio paging device having a calling circuit and modulation circuit supplied with message signals from said calling circuit, a wire type public-address (PA) device having a microphone and a PA amplifier supplied with the output from said microphone, two feeder lines which are connected to calling devices, a first low pass filter (LPF) consisting of two coils and being connected between said amplifier and said feeder lines in series, and a first high pass filter (HPF) comprising two capacitors and being connected in parallel between said modulation circuit and said feeder lines; and
said calling devices are comprised of a first and second calling devices, in which said first calling device comprises a first PA speaker, a second LPF provided between said first speaker and said feeder lines, an optical signal radiator being a wireless calling device, and a second HPF provided between said radiator and said feeder lines, and in which said second calling device comprises a second PA speaker, a third LPF provided between said second speaker and said feeder lines, a radio signal transmitter, and a third HPF provided between said transmitter and said feeder lines.

* * * * *